United States Patent [19]
Clark

[11] Patent Number: 5,626,443
[45] Date of Patent: May 6, 1997

[54] CONVEX-CONCAVE HOBS

[76] Inventor: Johnnie W. Clark, 2511 S. 57th Ct., Cicero, Ill. 60650

[21] Appl. No.: 613,451

[22] Filed: Mar. 1, 1996

[51] Int. Cl.$^6$ .................................................. B23F 21/16
[52] U.S. Cl. ................................................................ 407/26
[58] Field of Search ........................................ 407/23–27

[56] References Cited

U.S. PATENT DOCUMENTS

| | | | |
|---|---|---|---|
| 2,010,353 | 8/1935 | Edgar | 407/23 |
| 3,059,317 | 10/1962 | Pomernacki | 407/23 |
| 4,174,914 | 11/1979 | Ainoura | 407/26 |
| 4,322,185 | 3/1982 | Tanimoto et al. | 407/23 |
| 5,232,316 | 8/1993 | Tennutti | 407/23 |

FOREIGN PATENT DOCUMENTS

| | | | |
|---|---|---|---|
| 195841 | 3/1966 | U.S.S.R. | |
| 743800 | 6/1980 | U.S.S.R. | 407/23 |

*Primary Examiner*—M. Rachuba
*Assistant Examiner*—Kenneth J. Hansen
*Attorney, Agent, or Firm*—Patent & Trademark Services, Inc.; Joseph H. McGlynn

[57] ABSTRACT

A pair of complimentary gear cutting hobs including a convex hob having a plurality of hob teeth, with each hob tooth defining on opposite sides thereof cutting edges having a convex shape. The convex shape is defined by an arc with a center of radius which lies in the plane of the bottoms of the teeth. The complimentary hob is a concave hob having a plurality of hob teeth, with each hob tooth defining, on opposite sides thereof, cutting edges having a concave shape which is defined by an arc with a center of radius which lies in the plane of the tops of the teeth.

1 Claim, 1 Drawing Sheet

CONVEX-CONCAVE HOBS

BACKGROUND OF THE INVENTION

This invention relates, in general, to gear cutting hobs, and, in particular, to convex-concave hobs.

DESCRIPTION OF THE PRIOR ART

In the prior art various types of hobs are known. For example, U.S. Pat. No. 2,010,353 discloses a hob for cutting ratchets which does not have fillets between the sides of the teeth and the root portions. U.S. Pat. No. 3,059,317 discloses a tapered hob for cutting speed reduction gearing having hob teeth of unequal pressure angles which are form relieved in a direction which generally bisects the combined pressure angles of the teeth to provide a more efficient balance between the side clearances on opposite sides of the hob teeth. U.S. Pat. No. 4,322,185 discloses a staggered hob for cutting operations comprising a hob with a plurality of tooth elements each having a top edge portion of the same height arranged in succession along at least one helical line extending around the longitudinal axis of the hob wherein shoulder portions of leading or trailing sides of each of the tooth elements are reduced in their basic contour in staggered fashion. U.S. Pat. No. 5,232,316 discloses a hob with insert blade cutters which comprises a cylindrical main body having opposite ends and flanges including axially aligned slots for receiving the blades that are located only on the ends of the main body.

All gears that are made with the standard cutters slide when the gears are run together. However, gears of the present invention do not slide due to the fact that the concave hob's center of radius is at the top of the tooth and the center of radius of the convex hob is at the bottom of the tooth. When the gears cut with the hobs of the present invention are run together they will not slip since they will fit together like pieces of a jigsaw puzzle.

Sliding between gears is the source of many problems in today's gears. The faster a gear rotates, the faster the gears will slide with respect to each other. This produces friction between the gears, which in turn produces heat, which can damage the gears. However, if there is no sliding between the gears, there will be less friction and, therefore less heat.

If the gears are rotated at a low speed in order to produce more torque, the gear teeth will press together harder as the load increases. As the pressure between the teeth increases, the oil film between the teeth will be squeezed out by the sliding between the teeth, resulting in metal to metal contact.

The second major problem with the hobs of the prior art is, depending on the pressure angle, the hobs can only cut a certain number of teeth before they produce an undercut. The undercut is part of the profile that is cut away so the mating gear can roll with it. A gear cut with the convex hob will not produce an undercut no matter how small the number of teeth on the gear.

The present invention solves the above problems by producing teeth that will not slide with respect to each other.

SUMMARY OF THE INVENTION

The present invention invention includes a pair of complimentary gear cutting hobs. One of the hobs has a convex profile, when seen from the side, and the complimentary hob has a concave profile. The concave hob is used to cut the gear with the most teeth and the convex hob would cut the gear with the least number of teeth. The convex and concave hobs are exact mirror images of each other, i.e. they are a positive and a negative of each other.

It is an object of the present invention to provide a pair of complimentary hobs which cut gears that do not slide.

It is an object of the present invention to provide a convex hob which cuts a gear without producing an undercut.

These and other objects and advantages of the present invention will be fully apparent from the following description, when taken in connection with the annexed drawings.

DESCRIPTION OF THE PREFERRED EMBODIMENT

Figure 1:
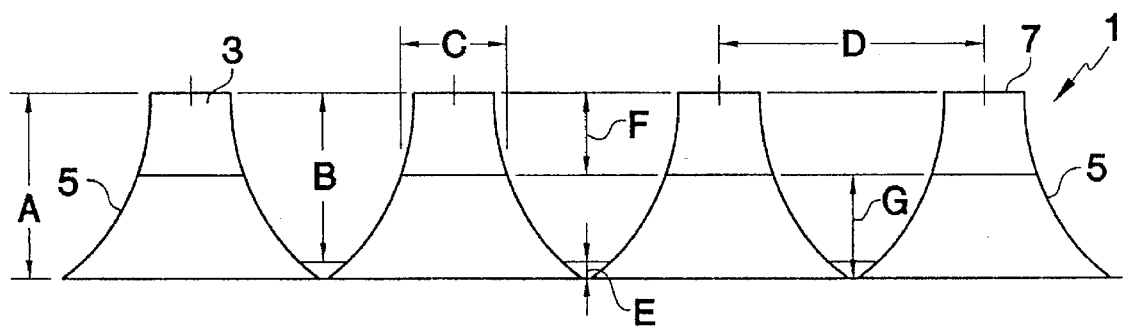
FIG. 1 is a view of the basic rack tooth form for the concave hob of the present invention.

Referring now to the drawings in greater detail, FIG. 1 shows the basic rack tooth form 1 for the concave hob 3. All measurements are 1" Diametral pitch. In order to determine measurements for other Diametral pitches, one would merely divide by the Diametral pitch used. For example: A is the depth of the tooth which is 2.157"/Diametral pitch, B is the working depth of the tooth which is 2.0"/Diametral pitch, C is the tooth thickness which is 3.14159"/(2× Diametral pitch), D is the center to center distance of the teeth which is 3.14159"/Diametral pitch, E is the clearance which is .157"/Diametral pitch, F is the addendum which is 1"/Diametral pitch and G is the dedendum which is 1.157"/ Diametral pitch.

Figure 2:
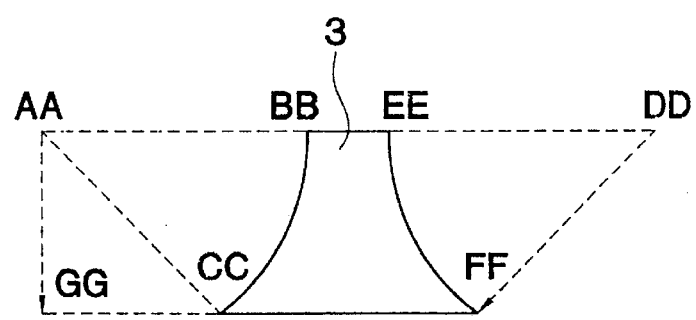
FIG. 2 is a view of a single tooth showing the radius of the tooth profile for the tooth shape of the concave hob of the present invention.

FIG. 2 shows a single tooth of the concave hob 3 with the center of radius (for the right profile located at DD, and for the left profile located at AA) of the tooth profiles located in the plane of the top of the teeth wherein:

$$AA \text{ to } BB = AA \text{ to } CC = DD \text{ to } EE = DD \text{ to } FF = 3.14159''/(2 \times \text{Diametral Pitch})$$

and $$AA \text{ to } GG = 2.157''/\text{Diametral Pitch.}$$

Figure 3:
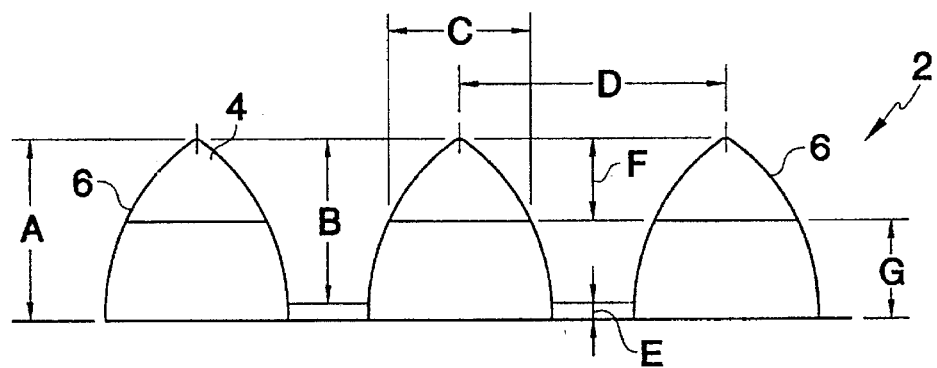
FIG. 3 is a view of the basic rack tooth form for the convex hob of the present invention.
Figure 4:
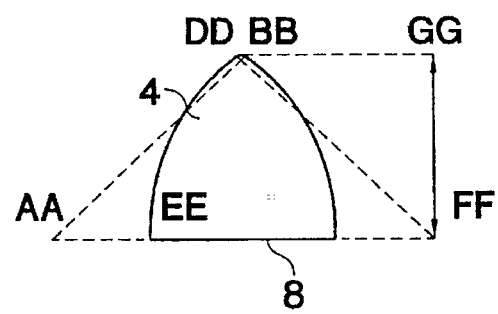
FIG. 4 is a view of a single tooth showing the radius of the tooth profile for the tooth shape of the convex hob of the present invention.

FIG. 3 shows the basic rack tooth form 2 for the convex hob 4 wherein measurements A through G are the same for both convex and concave hobs. FIG. 4 shows a single tooth of the convex hob 4 with the center of radius of the tooth profiles located in the plane of the bottom of the teeth wherein:

$$AA \text{ to } BB = AA \text{ to } CC = FF \text{ to } DD = FF \text{ to } EE = 3.14159''/(2 \times \text{Diametral Pitch})$$

and $$FF \text{ to } GG = 2.157''/\text{Diametral Pitch.}$$

All of the rack tooth proportions are exemplary only and may be changed without departing from the scope of the invention.

The unique character of the convex-concave hobs 1, 2 is due to the way in which the tooth profiles are made. The concave hob 1 has a tooth profile with curved sides 5, each curved side being defined by an arc with a center of radius (DD to FF or AA to CC) which lies in the plane of the tops 7 of the teeth 3. The convex hob 2 is complimentary to the concave hob 1 and has a tooth profile with curved sides 5 each of which is defined by an arc with a center of radius (AA to BB or FF to DD) which lies in the plane of the bottoms 8 of the teeth 4.

Gears that are cut with the convex-concave hobs are superior to other gears in that they don't slide when they are run together. Sliding is the source of many problems in gearing. The faster a gear pair spins, the more sliding between the gears. Increased sliding causes increased friction which causes increased heat in the gears. Increased load on the gears causes increased gear wear. Gears cut with the convex-concave hob do not heat up and wear out like the prior art gears. The convex hob is used to cut the gear having the lesser number of teeth. A gear that is cut with the convex hob will not produce an undercut no matter how small the number of teeth.

Although the convex-concave hobs and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. Gear cutting hobs comprising:

a pair of complimentary hobs including a convex hob and a concave hob, said convex hob having a plurality of hob teeth, each convex hob tooth defining, on opposite sides thereof, cutting edges having a convex shape, said convex hob teeth having a bottom and all of said bottoms of said convex hob teeth lying in a plane, said convex shape is defined by an arc with a center of radius which lies in said plane of the bottom of said convex hob teeth, said concave hob having a plurality of teeth which are complimentary with said convex hob teeth, each concave hob tooth defining, on opposite sides thereof, cutting edges having a concave shape, said concave hob teeth having a top and all of said tops of said concave hob teeth lying in a plane, said concave shape is defined by an arc with a center of radius which lies in the plane of the tops of said concave hob teeth.

* * * * *